Figure 1:
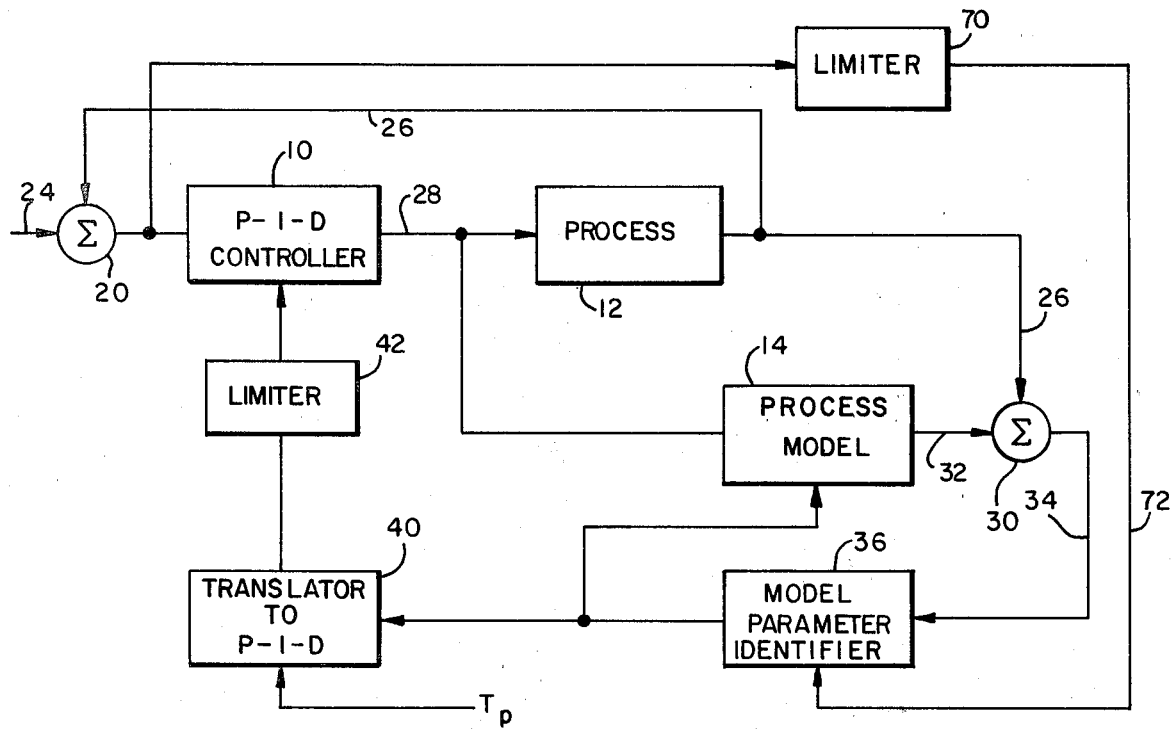

United States Patent [19]

Arcara et al.

[11] 4,407,013
[45] Sep. 27, 1983

[54] SELF TUNING OF P-I-D CONTROLLER BY CONVERSION OF DISCRETE TIME MODEL IDENTIFICATION PARAMETERS

[75] Inventors: Samuel A. Arcara, Telford; Paul Anderson, Green Lane, both of Pa.

[73] Assignee: Leeds & Northrup Company, North Wales, Pa.

[21] Appl. No.: 198,804

[22] Filed: Oct. 20, 1980

[51] Int. Cl.³ .................... G05B 13/04; G05B 11/42
[52] U.S. Cl. .................................. 364/149; 318/561; 364/157; 364/162
[58] Field of Search ............... 364/149, 150, 151, 157, 364/162; 318/561, 609, 610

[56] References Cited

U.S. PATENT DOCUMENTS

| | | |
|---|---|---|
| 3,621,217 | 11/1971 | Carr et al. .......................... 364/151 |
| 3,758,762 | 9/1973 | Littman et al. ................. 364/149 X |
| 3,828,171 | 8/1974 | Griffin ............................ 364/151 X |
| 4,054,780 | 10/1977 | Bartley et al. ...................... 364/151 |
| 4,195,337 | 3/1980 | Bertrand et al. .................... 364/151 |
| 4,197,576 | 4/1980 | Sanchez ............................. 364/151 |
| 4,214,300 | 7/1980 | Barlow et al. ...................... 364/157 |
| 4,214,301 | 7/1980 | Kurihara et al. ............... 364/150 X |

OTHER PUBLICATIONS

Oahlin, "Designing and Tuning Digital Controllers" Instruments and Control Systems, Jun. 1968, vol. 2, No. 6, pp. 77-83.
Touchstone et al., "Adaptive Control Through Instrumental-Variable Estimation of Discrete Model Parameters", Proceedings of ISA/77, Anaheim, Ca., May 2-5, 1977, pp. 57-64.

Primary Examiner—Joseph F. Ruggiero
Attorney, Agent, or Firm—Stuart E. Beck

[57] ABSTRACT

A P-I-D controller in a process control system is self tuned in response to discrete time model identification parameters which are converted to P-I-D form.

Additionally, the P-I-D parameters are limited to prevent them from exceeding the controller's specified range.

14 Claims, 2 Drawing Figures

SELF TUNING OF P-I-D CONTROLLER BY CONVERSION OF DISCRETE TIME MODEL IDENTIFICATION PARAMETERS

This invention relates to an automatic control system for a process and more particularly to a control system whereby the P-I-D controller is automatically tuned in response to an output signal generated by a discrete time process model.

In the tuning of conventional P-I-D controllers the operator must manually adjust the controller. The typical controller has three parameters, namely, proportional band, reset, and rate.

The manual adjustment of these parameters is accomplished by introducing changes in the set point to the controller and observing the response of the process variable which is being examined. Typically, the process variable may be temperature, pressure, viscosity or the like. The operator readjusts the controller parameters based on the observed response. An additional step change is introduced and the process variable is again observed with the operator again making a further change in the controller. This is continued until the operator decides that acceptable performance of the process variable has been achieved.

The tuning of the controller will maintain performance that is adequate only if the process remains unchanged. If a change occurs in the process, failure to change the controller may result in a loss of control over the process.

It would be desirable to be able to automatically tune the controller so that it can continuously control the process with a minimum amount of operator input. This can be accomplished by the use of a process model. Process models known in the art are most easily implemented as variable discrete time devices. The process controller which is used in most applications is a controller of the P-I-D type. However, the discrete time relationship between the process model and the means for varying the process model is in a form which is not usable by the P-I-D controller since the P-I-D controller parameters are defined for continuous time.

Therefore, in order to have a system whereby the P-I-D controller can be self tuned, it is necessary to translate the discrete time model identification parameters to the P-I-D parameters.

Additionally, it would be desirable to assure that the tuning parameters which are applied to the controller do not exceed its specified range.

Generally, the invention relates to a method for controlling a process of the type which includes generating a signal in response to a selected set point and providing a continuously tunable controller of the P-I-D type which is responsive to a first set of parameters and varying a process model in response to a second set of parameters and changing the second set of parameters to the first set of parameters and using the first set of parameters to control the P-I-D parameters as the controller.

Further, the invention generally relates to a method for controlling the values of the first set of parameters so that they fall within a range of parameters that can be accepted by the controller.

Still further, the invention generally relates to means for disabling the process model parameter identification means when the process is operating within predefined limits relative to the set point.

Figure 2:
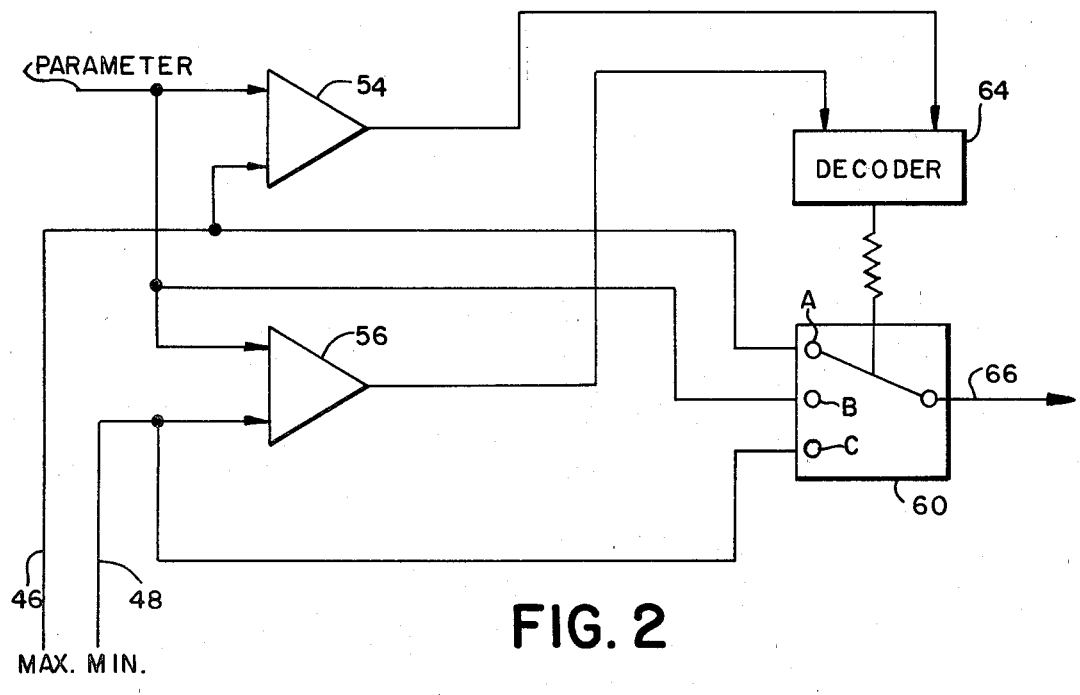

The invention can best be described by referring to the accompanying drawing where like numerals indicate the same parts throughout the several views and wherein FIG. 1 is a schematic drawing of a self tuning process control system FIG. 2 is a sketch of a limit control for the process parameters.

Referring to FIG. 1 in which the apparatus for controlling a process is illustrated, it can be seen that the apparatus includes P-I-D controller 10, the process which is being controlled 12, and a variable process model 14.

Briefly, the system illustrated in FIG. 1 works in the following manner. A summer 20 generates an input signal to the controller which tells the controller how to change its output. The signal is created in response to the difference in the signals corresponding to the selected set point signal 24 for the process and a signal 26 corresponding to the state of the process at a particular time. The controller generates an output signal 28 to vary the process 12.

The output signal 28 from the process controller is introduced into the process model 14. The output signal 26 from the process is also introduced into a summer 30. The summer also receives an output signal 32 from the process model 14. If there is a difference in the output signal from the process model and from the process, an error signal 34 is generated by summer 30 which is the input to a device for identifying the model parameters 36.

The device 36 determines the parameters of the process model and transmits those parameters to the process model 14 and to the P-I-D controller 10 after having been translated to P-I-D form by translator 40.

The P-I-D controller 10 output is responsive to a signal having the form $$\frac{100}{K_p}\left[ e(t) + \frac{1}{T_i} \int e(t)dt + T_d \frac{d\,e(t)}{dt} \right]$$

wherein e(t) = deviation signal that corresponds to the difference between the set point signal and the process variable signal $(100/K_p)$ = constant corresponding to the proportional band of said controller in percent $T_i$ = constant corresponding to the frequency of the reset of the process in repeats per minute $T_d$ = constant corresponding to the rate at which the controller output is varied in response to e(t)

and the output signal from the process model at any time has the form $$Y_n = a_1 X_{n-1} + a_2 X_{n-2} - b_1 Y_{n-1} - b_2 Y_{n-2}$$

wherein $Y_n$ = the output signal from said process model at the time n;

$Y_{n-1} = Y_n$ for the time preceeding the time n;

$Y_{n-2} = Y_n$ for the time preceeding the time n−1, $X_{n-1}$ = the output signal from said controller for the time proceeding the time n; and $X_{n-2}$ = the output signal from said controller for the time preceeding the time n−1; and $a_1$; $a_2$; $b_1$ and $b_2$ are constants whose values satisfy said process model input signal.

These relationships are well known in the literature. They are discussed by A. T. Touchstone and A. B. Corripio in *Adaptive Control Through Instrumental - Variable Estimation of Discrete Model Parameters*, proceedings of ISA/77, Anaheim, Calif., May 2-5, 1977, pp. 57-64 and E. B. Dahlin in *Designing and Tuning Digital Controllers in Instruments and Control Systems*, Vol. 42, No. 6 June 1968, pp. 78-83.

The translator 40 receives signals from the model parameter identifying means 36 and converts them into the parameters of the P-I-D controller equation, namely, the proportional band parameter $(100/K_p)$, the reset parameter $T_i$ and the rate parameter $T_d$ causing the resulting control system consisting of the controller and process to have a closed loop response time $T_p$. The closed loop response time is the time that it takes the process to respond to a predetermined amount of a change in set point.

The signal corresponding to $(100/K_p)$ has the form $$\frac{100\ T_p(a_1 + a_2)}{T_m(b_1 + b_2)}$$

in which $T_p$ is the selected closed loop response time, and $T_m$ is the rate at which the process model operates.

The signal corresponding to the value $(1/T_i)$ has the form $$\frac{1 - (b_1 + b_2)}{T_m(b_1 + b_2)}$$

while the signal corresponding to the value of $T_d$ has the form $$\frac{T_m b_2}{b_1 + 2b_2}$$

Optimum utilization of the tuning parameters for the P-I-D controller requires that the rate of operation of the model 14 be properly set. Thus, in calculating the reset parameter $T_i$, if the process is operated at too frequent a rate, the factor $(1-b_1-b_2)$ will approach zero. On the other hand, if the rate is very long, changes in the process may not be properly identified.

Therefore, the rate at which the model operates must be variable in order to make it compatible with a wide range of process time constants.

Thus, it is likely that the process model 14 will operate at a rate which is different than the rate at which the controller 10 operates. Preferably, the model operates at a rate which is less than the controller rate and the model operating rate is varied in proportion to the desired closed loop response time of the process.

Further, for the operating rate of the model and the controller to have correspondence at least at some intervals, it is preferred that their ratio of operation be an integer which is a ratio of the closed loop response time for the process and the operating time for the controller.

In the continuous tuning controller, the tuning parameters are constantly adjusted by the model parameter identification means 36. To prevent the controller tuning parameters from the exceeding the controller's specified range, the parameters generated by the translator 40 pass through a limiter 42 before being received by controller 10. The limiter for one of the parameters such as proportional band, $(100/K_p)$ is shown in FIG. 2; it being understood that the limit checks for the reset parameter $(1/T_i)$ and the rate $T_d$ are the same. Thus, maximum and minimum values for the parameters are established by suitable means 46 and 48. These values are used as inputs to comparators 54 and 56 in which they function as reference values against which the signal corresponding to $(100/K_p)$ is measured.

The limiter includes a switch 60 which has three contacts. Contacts "A" and "C" are each connected to the maximum and minimum values for the parameters. Contact "B" corresponds to the value of the parameter as it enters the comparators.

Should either of the comparators 54 or 56 detect that the signal corresponding to $(100/K_p)$ is either at or exceeds the maximum or the minimum value it will send a signal to decoder 64 that will throw switch 60 to engage either contact "A" or "C" depending on whether the maximum or minimum limit is reached.

If contacts "A" or "C" are engaged by the switch then the signal to the controller on output line 66 is the maximum value or the minimum value as determined at 46 and 48.

On the other hand, if the parameter falls within the maximum and minimum values, switch contact "B" is engaged and the actual value of the parameter generated by the translator 38 is provided to the controller.

Limiter 70 which operates in a generally similar manner to limiter 42 prevents the parameters from changing when the process is operating at the set point. Thus, as long as the error signal which is generated by summer 20 to the controller 10 falls within a predetermined range such as plus or minus 0.5 percent the model parameter identification element 36 receives a signal 72 which disables it. When the error signal to the controller falls outside the predetermined range then the parameter identification means 36 is operative to change the process model.

The limit check 70 is therefore useful in preventing the tuning parameters from drifting while process is underway. Therefore, the model will change values only when the set point is changed or process changes.

Thus, what has been described is a system which takes a discrete information closed loop process control, combines it with the operator selected response time and translates it to a form which is useful in P-I-D controller.

Further, means are disclosed for operating the model at a rate which is proportional to the selected closed loop response time. This makes the model operable over a wide range of process time constants.

Further, means have been disclosed which are operative to maintain the values of the P-I-D parameters within preset values so that they can be read and accepted by the controller while at the same time means are provided for disabling the model parameter identification means when the process is operating within predefined limits relative to the set point.

Thus, while the invention has been described with respect to certain modalities thereof, it is apparent that other modalities will be obvious to those skilled in the art in view of the foregoing description. Thus, while the invention has described in connection with a particular method, it should not be limited thereby, but, rather, only by the scope of the claims appended hereto.

What is claimed is:

1. In a method for controlling a process of the type which includes generating a signal which corresponds to a selected set point, providing a continuously tunable controller of the type which has at least a variable integral and a variable differential characteristic wherein said characteristics vary in response to a first set of parameters having a first form, and wherein said tunable controller controls a process and a variable process model and wherein said variable process model is responsive to a second set of parameters having a second form, and means are provided for varying said second set of parameters, the improvement comprising providing means for changing the form of said second set of parameters to the form of said first set of parameters and using said last named set of parameters to individually control each of the characteristics of said tunable controller.

2. The method as defined in claim 1 wherein said controller is responsive to a signal having the form $$\frac{100}{K_p}\left[e(t) + \frac{1}{T_i}\int e(t)dt + T_d\frac{d\,e(t)}{dt}\right]$$

wherein $e(t)$ = deviation signal that corresponds to the difference between the set point signal and the process variable signal $(100/K_p)$ = constant corresponding to the proportional band for said controller in percent $T_i$ = constant corresponding to the frequency of the reset of the process in repeats per minute $T_d$ = constant corresponding to the rate at which the controller output is varied in response to e(t).

3. The method as defined in claim 2 wherein the output signal of the process model at any time has the form $$Y_n = a_1 X_{n-1} + a_2 X_{n-2} - b_1 Y_{n-1} - b_2 Y_{n-2}$$

wherein $Y_n$ = the output signal from said process model at the time n;

$Y_{n-1} = Y_n$ for the time preceeding the time n;

$Y_{n-2} = Y_n$ for the time preceeding the time n−1, $X_{n-1}$ = the output signal from said controller for the time preceeding the time n; and $X_{n-2}$ = the output signal from said controller for the time preceeding the time n−1; and $a_1$; $a_2$; $b_1$ and $b_2$ are constants whose values satisfy said process model input signal.

4. The method of claim 3 wherein a signal corresponding to the value of $(100/K_p)$ has the form $$\frac{100\,T_p(a_1 + a_2)}{T_m(b_1 + b_2)}$$

in which $T_p$ = the selected process response time, and $T_m$ = the rate at which said process model operates.

5. The method of claim 3 wherein a signal corresponding to the value of $(1/T_i)$ has the form $$\frac{1 - (b_1 + b_2)}{T_m(b_1 + b_2)}$$

in which $T_m$ = the rate at which said process model operates.

6. The method of claim 3 wherein a signal corresponding to the value of $T_d$ has the form $$\frac{T_m b_2}{b_1 + 2b_2}$$

in which $T_m$ = the rate at which said process model operates.

7. The method as defined in claim 1 including the step of operating said process model at a rate which is different than the rate at which said controller operates.

8. The method as defined in claim 7 in which said process model operating rate is less than said controller operating rate and said model operating rate is varied in proportion to a desired closed loop response time of said process to a change in said set point.

9. The method as defined in claim 8 wherein said proportion is an integer which is a ratio of said closed loop response time for said process and the operating rate of said controller.

10. The method as defined in claim 1 wherein the signals corresponding to the values of said parameters are compared with reference signals corresponding to predetermined maximum and minimum values, and signals between said maximum and minimum values are applied to said controller.

11. The method as defined in claim 10 wherein said reference signal having said maximum value is applied to said controller when the value of said signals corresponding to said parameters exceeds said maximum values.

12. The method as defined in claim 10 wherein said reference signal having said minimum values is applied to said controller when the value of said signals corresponding to said parameters falls below said minimum value.

13. The method as defined in claim 1 wherein said means for changing said parameters is responsive to a selected closed loop response time.

14. A method as defined in claim 1 wherein means are provided for identifying said second set of parameters, and said last named means is disabled when said process is operating within predefined limits relative to said set point.

* * * * *